(12) United States Patent
Hitchcock et al.

(10) Patent No.: US 12,432,221 B2
(45) Date of Patent: Sep. 30, 2025

(54) DATALINK ARBITRATION WITH FRAMED BROADCAST

(71) Applicant: Bell Textron Inc., Fort Worth, TX (US)

(72) Inventors: Aaron Mitchell Hitchcock, Fort Worth, TX (US); Hunter Nelson Morgan, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 670 days.

(21) Appl. No.: 17/087,482

(22) Filed: Nov. 2, 2020

(65) Prior Publication Data

US 2025/0286897 A1    Sep. 11, 2025

(51) Int. Cl.
*H04L 9/40* (2022.01)

(52) U.S. Cl.
CPC .................. *H04L 63/123* (2013.01)

(58) Field of Classification Search
CPC ...................................................... H04L 63/123
USPC ......................................................... 370/310
See application file for complete search history.

(56) References Cited

U.S. PATENT DOCUMENTS

| | | | | |
|---|---|---|---|---|
| 7,515,612 B1* | 4/2009 | Thompson | ............ | H04L 69/166 709/236 |
| 8,639,396 B1* | 1/2014 | Hirsch | ............... | G05D 1/104 340/995.13 |
| 9,927,807 B1* | 3/2018 | Ganjoo | ............... | G08G 5/0069 |
| 10,374,692 B1* | 8/2019 | Banerian | ................ | H04B 7/19 |
| 10,581,564 B1* | 3/2020 | Wu | ............... | G08G 5/0021 |
| 10,785,607 B2* | 9/2020 | Balasubramanian | ... | H04W 4/40 |
| 2002/0137459 A1* | 9/2002 | Ebata | ............... | H04W 28/06 370/312 |
| 2005/0175012 A1* | 8/2005 | Gupta | ............... | H04L 1/187 370/394 |
| 2006/0058931 A1* | 3/2006 | Ariyur | ............... | G08G 5/0078 701/23 |
| 2010/0067526 A1* | 3/2010 | Lovmand | ............... | G05B 15/02 370/389 |
| 2013/0338858 A1* | 12/2013 | Cherepinsky | ............ | G06F 16/285 701/3 |
| 2015/0142211 A1* | 5/2015 | Shehata | ............... | H04N 7/185 701/2 |

(Continued)

*Primary Examiner* — Christopher M Crutchfield
*Assistant Examiner* — Jean F Voltaire
(74) *Attorney, Agent, or Firm* — Lightfoot & Alford PLLC

(57) ABSTRACT

A method of arbitrating communications between unmanned aerial system (UAS) devices includes: receiving, at a first communication component of a first UAS device, information for transmission to a destination associated with a second UAS device; inserting, by a first arbiter executing on the first communication component, a message sequence indication into a payload of a data packet that contains the information; transmitting, by the first arbiter, a respective copy of the data packet over each of a plurality of communication links established between the first and second UAS devices; receiving, at a second communication component of the second UAS device, one or more copies of the data packet; and determining in accordance with the message sequence indication, by a second arbiter executing on the second communication component, for each received copy of the data packet, whether to deliver the information to the destination.

13 Claims, 3 Drawing Sheets

(56) References Cited

U.S. PATENT DOCUMENTS

2017/0235316 A1\* 8/2017 Shattil .................... H04W 4/40
                                                                          701/3

\* cited by examiner

DATALINK ARBITRATION WITH FRAMED BROADCAST

STATEMENT REGARDING FEDERALLY SPONSORED RESEARCH OR DEVELOPMENT

The invention described herein was made in the performance of work under NASA Contract 80AFRC19M0004 and is subject to the provisions of section 20135 of the National Aeronautics and Space Act (51 U.S.C. § 20135).

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The technology of unmanned aerial vehicles (UAVs) and applications for their use continues to evolve at a rapid pace. For example, drones are used for aerial photography, to fill combat roles, by hobbyists, and are contemplated for use in the delivery of goods and services and in transporting people. As UAV use continues to proliferate, the reliability of communication links between UAVs in an airspace and control centers on the ground is increasingly prioritized.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Systems, methods, and apparatuses for arbitrating communications between devices of an unmanned aerial system (UAS) are disclosed herein. The systems, methods, and apparatuses can be implemented, for example, to arbitrate communications between an unmanned aerial vehicle (UAV) and a corresponding ground control station (GCS).

Figure 1:
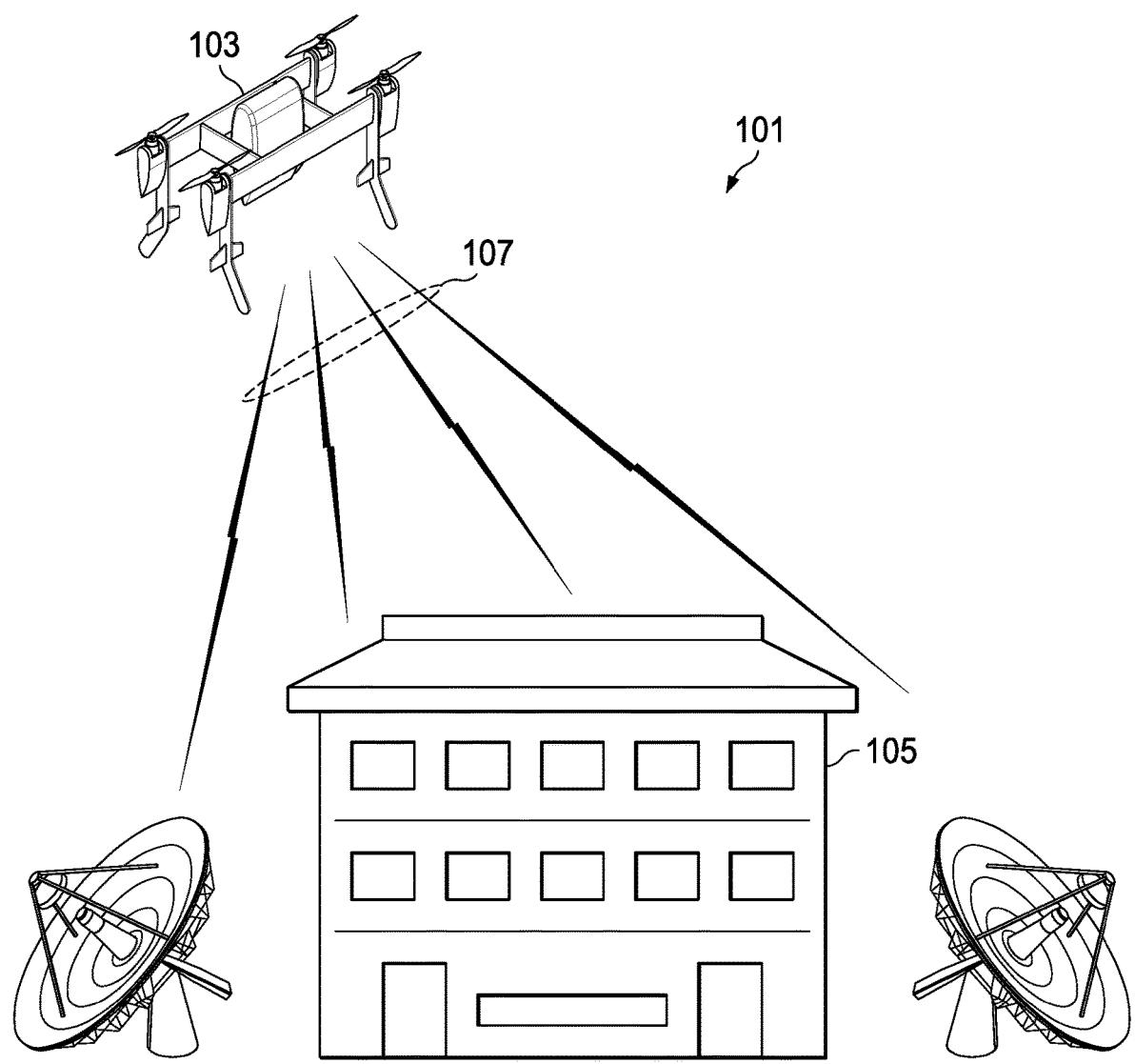
FIG. 1 is a diagram illustrating an unmanned aircraft system (UAS) that includes an unmanned aerial vehicle (UAV) and a corresponding ground control station (GCS).

FIG. 1 is a diagram illustrating an unmanned aircraft system (UAS) 101. In this embodiment, UAS 101 includes an unmanned aerial vehicle (UAV) 103, a corresponding ground control station (GCS) 105, and a plurality of communication links 107 that are established between UAV 103 and GCS 105.

UAV 103 includes a communication component (not shown) that is configured to send and receive data over communication links 107. In this embodiment, the communication component comprises a network appliance that is adapted to send and receive data packets over one or more air interfaces. The network appliance can include one or more radios and can be adapted to natively provide access to the air interfaces, for example via one or more suitable radio access technologies. Alternatively, the network appliance can be communicatively coupled to one or more separate devices adapted to provide the air interfaces. Preferably, the network appliance of UAV 103 includes native memory for storing instructions and data and one or more processors adapted to execute the instructions. In this embodiment, the communication component is implemented within an air data terminal (ADT) (not shown) that is communicatively coupled to one or more systems of UAV 103.

In this embodiment, the communication component is implemented as part of a control system of UAV 103 (not shown). However, it should be appreciated that the communication component can be alternatively implemented within UAV 103, for example as a standalone component. The control system of UAV 103 includes components that are separate from those of the network appliance, such as control system memory for storing instructions and data, one or more control system processors, and one or more sensor components. The sensor components can be used for navigation, object detection, collision avoidance, etc. and can include one or more of a Global Positioning System (GPS) receiver, a light detection and ranging (LiDAR) unit, one or more cameras, a magnetometer, one or more accelerometers, an inertial measurement unit (IMU), an attitude and heading reference system (AHRS), a rate gyro, and a barometric altitude sensor. Such sensor components can be provided as high-performance micro-electro-mechanical system (MEMS) sensors, for example.

The one or more control system processors are adapted to execute instructions to perform functions of UAV 103, such as controlling flight of UAV 103 and monitoring and governing interactions between the one or more control system processors and other control system components, such as information output by the navigation components and signals or data received by the communication component, for instance flight control information received from GCS 105. UAV 103 can be adapted for autonomous flight control, flight control via pilot input, or any combination thereof such as semi-autonomous flight control.

In this embodiment, GCS 105 is implemented as a stationary land-based control center that provides facilities monitoring and/or control, for example active piloting, of one or more UAVs operating in one or more respective airspaces. However, in alternative embodiments, a GCS can be sea-based, carried by a mobile system, carried in flight, carried by a satellite, or otherwise provided stationary or movable relative to a UAV, such as UAV 103. GCS 105 includes one or more communication components (not shown) that are configured to send and receive data over communication links 107. In this embodiment, a communication component of GCS 105 comprises a network appliance that is adapted to send and receive data packets over one or more air interfaces. The network appliance can be adapted to natively provide access to the air interfaces, for example via one or more radios and one or more suitable radio access technologies. Alternatively, the network appliance can be communicatively coupled, for example via one or more hard-wired internet connections, to one or more separate devices adapted to provide the air interfaces. Preferably, the network appliance of GCS 105 includes native memory for storing instructions and data and one or more processors adapted to execute the instructions. In this embodiment, the communication component is implemented within a ground data terminal (GDT) (not shown) that is communicatively coupled to one or more systems of GCS 105.

In this embodiment, communication links 107 are established between UAV 103 and GCS 105 via respective air interfaces. The air interfaces may be any suitable wireless communication links (e.g., radio frequency (RF), microwave, infrared (IR), ultraviolet (UV), visible light, etc.). The air interfaces may be established using any suitable radio access technology or combination of radio access technologies. For example, the respective network appliances of UAV 103 and GCS 105 may be implemented with a radio technology such as Evolved UMTS Terrestrial Radio Access (E-UTRA) which may establish the air interfaces using Long Term Evolution (LTE) and/or LTE Advanced (LTE-A), with a radio adapted to communicate via satellite communications (Satcom), or a combination thereof.

One or more of communication links 107 can comprise an air interface portion and one or more hard-wired portions. For example, in an embodiment, a communication link 107 can comprise an LTE air interface portion from UAV 103 to a cell tower, and a hard-wired internet connection portion, for example provided via an Internet Service Provider (ISP), from the cell tower to GCS 105. In another embodiment, a communication link 107 can comprise a Satcom air interface portion established between UAV 103 and a satellite that relays radio signals to a receiver located on Earth, and a hard-wired internet connection portion, for example provided via an ISP, from the receiver to GCS 105.

As shown, four communication links 107 are established between UAV 103 and GCS 105. However, it should be appreciated that UAS 101 is not limited to four communication links 107, and that more or fewer communication links can be established between UAV 103 and GCS 105, for example in accordance with parameters related to a mission to be carried out by UAV 103, such as which airspace UAV 103 will operate in, whether the airspace is restricted, current traffic levels in the airspace, etc. Preferably, at least two of the plurality of communication links 107 are router diverse from each other or are otherwise protected against a single point of failure.

In this embodiment, the respective communication components of UAV 103 and GCS 105 are adapted to maintain four communication links 107 throughout the duration of flight if possible. More specifically, the communication components are configured to, in the event one or more existing communication links 107 is lost or degrades such that communication is compromised, attempt to establish one or more replacement communication links 107.

Figure 2:
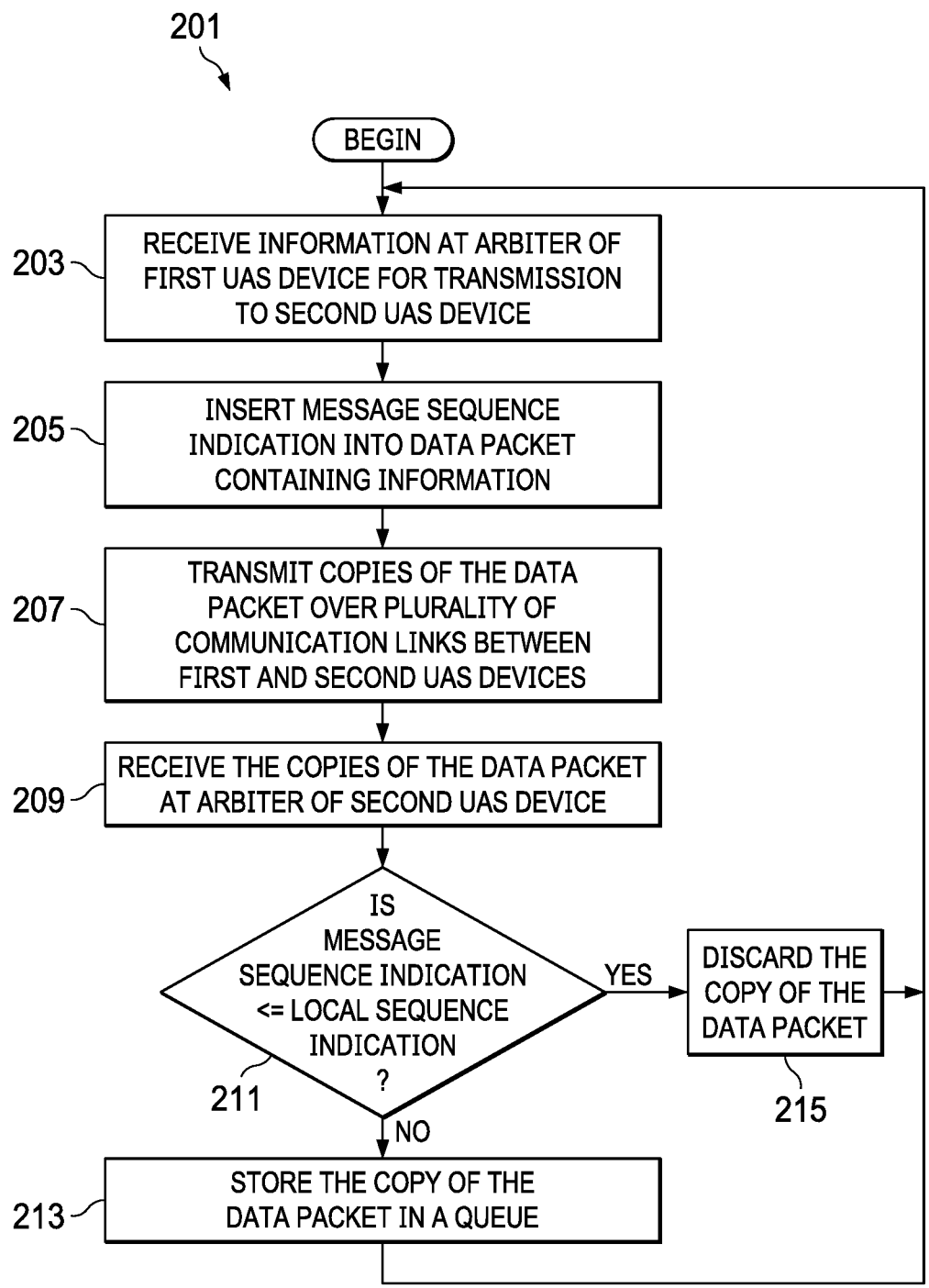
FIG. 2 is a flowchart illustrating a process for use in a UAS, such as the UAS illustrated in FIG. 1, of arbitrating datalinks between a UAV and a corresponding GCS, in accordance with this disclosure.

FIG. 2 is a flowchart illustrating a method 201 of arbitrating communications between devices of an unmanned aerial system (UAS), such as UAV 103 and GCS 105 of UAS 101, in accordance with this disclosure. In this embodiment, method 201 is performed by software module arbiters that are implemented as computer programs executable on the communication components of UAV 103 and GCS 105. An arbiter can be instantiated on the network appliance of a communication component of UAV 103 or GCS 105, for example by a processor of the communication component executing instructions stored in its memory. Preferably, the arbiters and method 201 are embodied in computer-executable instructions that are stored in the respective memories of, and that are executed by the respective processors of, the communication components of UAV 103 and GCS 105.

In this embodiment, each arbiter executed on a first UAS device may establish a unidirectional logical link to a corresponding arbiter on a second UAS device. To facilitate bi-directional communication between first and second devices of a UAS, each device may instantiate a first arbiter that receives data packets from a corresponding arbiter of the second device, and a second arbiter that sends data packets to a corresponding arbiter of the second device. In this regard, bi-directional communication is enabled by two logical links between the first and second UAS devices. Both logical links send and receive data packets over each of a plurality of communication links.

To illustrate, the network appliance in the communication component of UAV 103 can instantiate an arbiter to send data packets to GCS 105 over communication links 107 and GCS 105 can instantiate a corresponding arbiter to receive the data packets from UAV 103. Similarly, the network appliance in the communication component of GCS 105 can instantiate an arbiter to send data packets to UAV 103 over communication links 107 and UAV 103 can instantiate a corresponding arbiter to receive the data packets from GCS 105. Accordingly, the arbiters establish two logical links over communication links 107 between UAV 103 and GCS 105.

With reference to FIG. 2, the respective communication components of a first UAS device and a second UAS device may instantiate respective an arbiter to establish bi-directional communication between the devices over a plurality of communication links. The arbiter on the first UAS device and the arbiter on the second UAS device establish a logical link between the first and second devices and can be referred to as an arbiter pair. It should be appreciated that the systems and methods described in this disclosure are not limited to instantiating a single pair of arbiters on the communication component of a UAS device. For example, the respective communication components of first and second devices of a UAS can instantiate multiple pairs of arbiters.

Each pair of arbiters can be adapted to send and receive particular types of data. For example, a pair of arbiters can be adapted with operational parameters that differ from those of other arbiter pairs, for example in accordance with transmission preferences related to the type of data being sent or received. Such operational parameters may include one or more of, timing, reordering, priority based on data type, and data loss, for example. Additionally, the separate arbiters of a pair can be adapted with differing parameters relative to each other, for example if it is desirable to send data in one direction using different parameters than those used to send data in the opposite direction. Furthermore, an arbiter can be adapted to adjust its operational parameters on the fly, for example in accordance with the type of data being sent or received.

In this embodiment, the arbiters reside at the application layer of the Open Systems Interconnection (OSI) model, and exchange data with one another using Internet Protocol (IP)-based communications. In particular, the arbiters are adapted to exchange data with one another via User Datagram Protocol (UDP) messages. Once the arbiters have established logical links between the devices, the arbiters can perform method 201 to exchange information with each other.

For illustrative purposes, method 201 is described herein using an example of arbitrating communications between devices of UAS 101. More specifically, method 201 is described using an example of arbitrating communication from UAV 103 to GCS 105. However, it should be appreciated that the performance of method 201 is also applicable to arbitrating communication from GCS 105 to UAV 103, and more generally that method 201 can be performed to arbitrate communications between other UAS devices. Furthermore, for the sake of simplicity, method 201 is described herein with reference to a single arbiter pair, with one arbiter instantiated on UAV 103 and a corresponding arbiter instantiated on GCS 105.

At step 203, the network appliance in the communication component of UAV 103 receives information for transmission to a destination associated with GCS 105. The information may be, for example, telemetry data related to UAV 103. In this embodiment, the information is received by an arbiter executing on the network appliance of UAV 103 that is adapted to send data to a corresponding arbiter on the network appliance of GCS 105 that is adapted to receive data from UAV 103.

At step 205, the arbiter of UAV 103 causes the information to be loaded into a payload of a UDP data packet. Additionally, the arbiter inserts a message sequence indication into the data packet. In this embodiment, the message sequence indication is a numerical sequence that is embedded in the payload of the UDP packet containing the information. Furthermore, in this embodiment the arbiters are adapted to reserve the first 64 bits of the payload of each UDP packet for storing the message sequence indication. However, it should be appreciated that the arbiters can be alternatively configured to use more or fewer bits of the payload for embedding the message sequence indication. Additionally, the arbiters can be alternatively configured to use the reserved portion of the UDP packet payload to embed data other than just the message sequence indication. For example, the arbiters can be alternatively configured to embed other data, such as a time stamp, into the payload alongside the message sequence indication.

At step 207, the arbiter of UAV 103 causes a copy of the data packet to be sent over each of the plurality of communication links 107 to the corresponding arbiter of GCS 105. Preferably, the arbiter of UAV 103 causes the copies of the data packet to be transmitted simultaneously across the communication links 107. In this embodiment, transmissions from the arbiter of UAV 103 to GCS 105 are sent over respective virtual private network (VPN) tunnels established on the plurality of communication links 107.

At step 209, one or more copies of the data packet sent by the communication component of UAV 103 is received at the network appliance of GCS 105. More specifically, the one or more copies of the data packet are received by an arbiter executing on the network appliance of GCS 105 that is adapted to receive data from the arbiter of UAV 103. The one or more copies of the data packet received at GCS 105 may include all or fewer of the copies transmitted by the arbiter of UAV 103. The one or more copies of the data packet may be received at the communication component of GCS 105 at the same or different times.

At step 211, the arbiter of GCS 105 determines, for each received copy of the data packet, whether to deliver the information contained in the payload of the data packet to the destination. In this embodiment, the arbiter of GCS 105 is configured to make the determination of whether to deliver the information by comparing the message sequence indication from the received data packet with a local sequence indication maintained by the arbiter of GCS 105.

At the time when a logical link is established between a pair of arbiters, before any messages are transmitted over the logical link, the arbiter that is configured to receive messages sets the local sequence indication to zero. Subsequently, when a message sent by the arbiter of UAV 103 is received, the arbiter of GCS 105 reads the message sequence number from the payload of the received data packet and compares it with a current value of the local sequence indication.

If the value of the message sequence indication is greater than the current value of the local sequence indication, method 201 proceeds to step 213. At step 213, the arbiter of GCS 105 causes the payload of the received data packet to be stored in a queue maintained by the network appliance of GCS 105 for subsequent delivery to the destination. Method 201 then returns to step 203.

If the value of the message sequence indication is less than or equal to the current value of the local sequence indication, method 201 proceeds to step 215. At step 215, the arbiter of GCS 105 causes the received data packet to be discarded. Method 201 then returns to step 203. When the value of the message sequence indication is less than or equal to the current value of the local sequence indication, it indicates that the data packet is a duplicate of a data packet already processed by the arbiter of GCS 105 and stored in the queue. Discarding such data packets prevents the delivery of duplicate information to the destination and preserves storage space in the queue.

Figure 3:
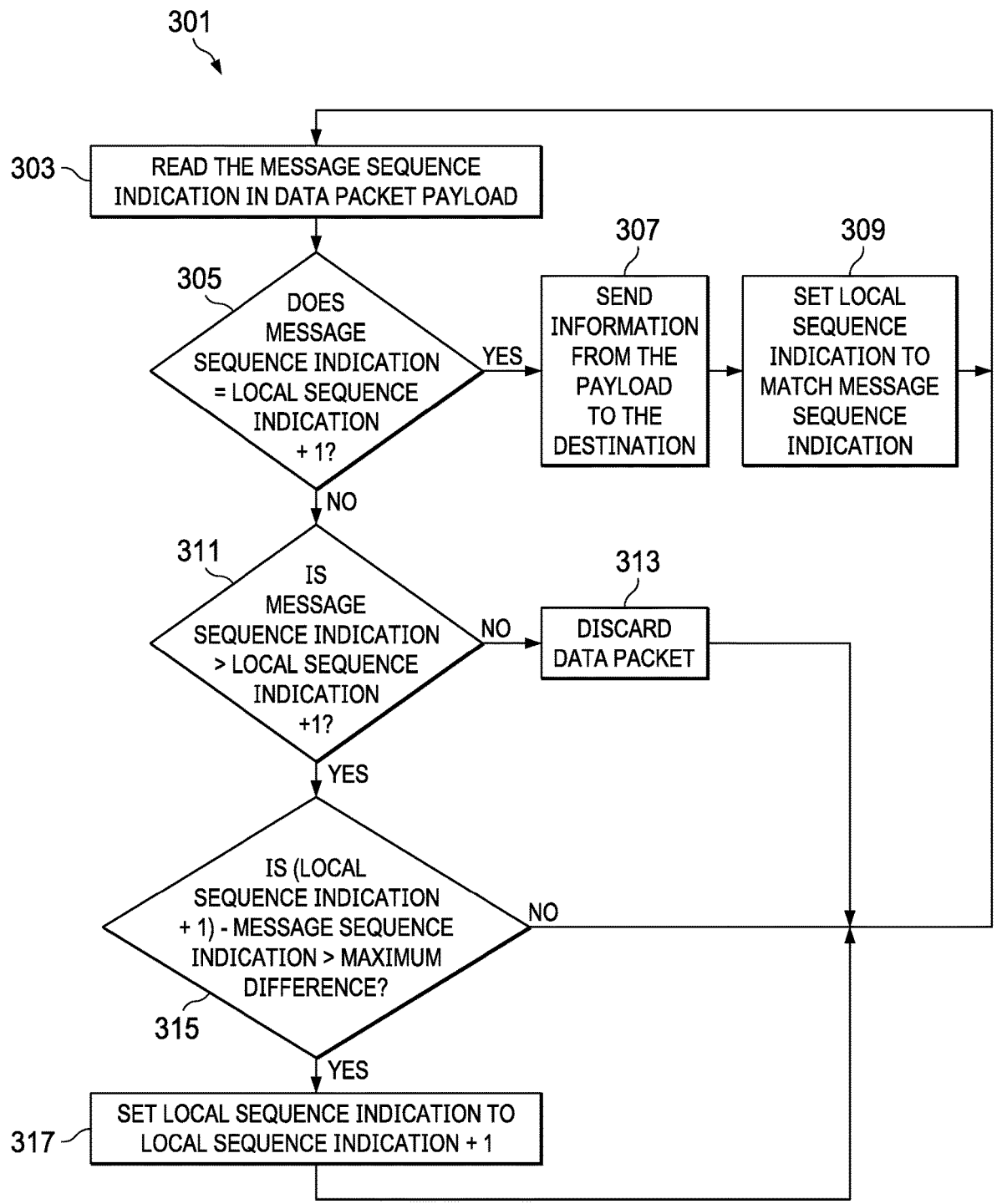
FIG. 3 is a flowchart illustrating a process for operating a queue maintained by a software module arbiter that executes on the communication components of one or more devices in the UAS illustrated in FIG. 1, in accordance with this disclosure.

FIG. 3 is a flowchart illustrating a method 301 of operating the queue maintained by an arbiter configured to receive data packets, such as the queue maintained by the arbiter executing on the network appliance of GCS 105, in accordance with this disclosure. In this embodiment, method 301 is performed by the arbiter of GCS 105. The arbiter of GCS 105 may perform method 301 independently of but concurrent with the performance of method 201. Alternatively, the steps of method 301 can be integrally implemented within method 201.

For illustrative purposes, method 301 is described herein using the example of arbitrating communications from UAV 103 to GCS 105. However, it should be appreciated that the performance of method 301 is also applicable to operating a queue maintained by an arbiter executing on the network appliance of UAV 103 that is configured to receive data packets from a corresponding arbiter executing on the network appliance of GCS 105.

At step 303, the arbiter of GCS 105 reads the message sequence indication in the payload of a data packet stored in the queue.

At step 305, the arbiter of GCS 105 compares the message sequence indication from the examined data packet with an incremented value of the local sequence indication. More specifically, in this embodiment the arbiter of GCS 105 increments the current value of the local sequence indication by one when making the comparison.

If the value of the message sequence indication from the examined data packet equals the incremented value of the local sequence indication, method 301 proceeds to step 307. At step 307, the arbiter of GCS 105 causes the information from the payload of the data packet to be delivered to the destination. The method then proceeds to step 309. At step 309, the arbiter of GCS 105 sets the value of the local sequence indication to equal the value of the message sequence indication. Method 301 then returns to step 303.

If the value of the message sequence indication from the examined data packet does not equal the incremented value of the local sequence indication, method 301 proceeds to step 311. At step 311, the arbiter of GCS 105 determines whether the value of the message sequence indication from the examined data packet is greater than the incremented value of the local sequence indication.

If the value of the message sequence indication from the examined data packet is not greater than the incremented value of the local sequence indication, method 301 proceeds to step 313. At step 313, the arbiter of GCS 105 causes the received data packet to be discarded. Method 301 then returns to step 303.

If the value of the message sequence indication from the examined data packet is greater than the incremented value of the local sequence indication, method 301 proceeds to step 315. At step 315, the arbiter of GCS 105 determines whether the incremented value of the local sequence indication, minus the message sequence indication from the examined data packet, is greater than a maximum difference value. In this embodiment, the maximum difference value is configurable and is maintained by the arbiter of GCS 105. The maximum difference value can be predetermined and set within an arbiter, for example in accordance with a type of data transmitted by the arbiter, such as the arbiter of GCS 105 for example. An arbiter can be adapted to dynamically adjust the maximum difference value, for example in response to changing conditions of one or more of communication links 107.

The maximum difference value is associated with the operation of a window of virtual storage in the queue. The window of virtual storage accounts for a scenario wherein the arbiter of GCS 105 receives a data packet (hereinafter an "early data packet") having a message sequence indication that is ahead of the message sequence number of the immediately previous data packet (hereinafter the "last data packet") from which information was sent to the destination.

The window of virtual storage allows the arbiter of GCS 105 to delay sending the information contained in the payload of the early data packet to the destination until one or more data packets having message sequence indications in between those of the early data packet and the last data packet are received at the arbiter of GCS 105. The arbiter of GCS 105 is configured with the ability to reorder data packets within the queue in accordance with their respective message sequence indications. The arbiter of GCS 105 is further configured to, when data packets having message sequence indications in between those of the early data packet and the last data packet are subsequently received, send the respective information in the received packets within the window of virtual storage in the queue to the destination in their intended order. A size of the window of virtual storage is governed by the maximum difference value.

When, at step 315, the arbiter of GCS 105 determines that the incremented value of the local sequence indication, minus the message sequence indication from the examined data packet, is not greater than the maximum difference value, method 301 returns to step 303.

When, at step 315, the arbiter of GCS 105 determines that the incremented value of the local sequence indication, minus the message sequence indication from the examined data packet, is greater than the maximum difference value, method 301 proceeds to step 317.

At step 317, the arbiter of GCS 105 sets the value of the local sequence indication to equal the value of the message sequence indication of the early data packet. Method 301 then returns to step 303. The performance of step 317 resets the window of virtual storage, effectively causing the window to move such that the maximum difference value is measured from the message sequence indication of the early data packet. In this regard, the early data packet becomes the last data packet relative to a subsequently received early packet.

It should be appreciated that methods 201 and 301 are not limited to being performed by devices of a UAS. For example, portions or the entireties of methods 201 and 301 can be adapted for performance by any device that benefits from reliable, real-time communication with minimal latency, such as a video or audio streaming device, for example. It should further be appreciated that implementation of methods 201 and 301 is not limited to a UAS having a single ADT and a single GDT, such as UAS 101. For example, methods 201 and 301 can be applied within a UAS having any number of devices (e.g., ADTs, GDTs, and the like). It should further still be appreciated that methods 201 and 301 are agnostic to the type of links implemented as communication links 107, as long as the respective communication components are capable of sending and receiving IP packets, for example via an IP radio or with serial to ethernet conversion capability.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of arbitrating communications between devices of an unmanned aerial system (UAS), the method comprising:
   inserting, by a first arbiter, a message sequence indication into a payload of a user datagram protocol data packet;
   comparing the message sequence indication to a local sequence indication maintained by a second arbiter;
   when a value of the message sequence indication is greater than a value of the local sequence indication, storing the copy of the data packet in a queue for subsequent delivery;
   comparing, by the second arbiter, the message sequence indication in the copy of the data packet stored in the queue with an incremented value of the local sequence indication;
   when the value of the message sequence indication equals the incremented value of the local sequence indication, delivering the information to the destination and setting the value of the local sequence indication to match the value of the message sequence indication; and
   when the value of the message sequence indication is greater than the incremented value of the local sequence indication, discarding the copy of the data packet.

2. The method of claim 1, wherein the first device is an unmanned aerial vehicle (UAV).

3. The method of claim 2, wherein the first network appliance is an air data terminal (ADT) that is communicatively coupled to one or more systems of the UAV.

4. The method of claim 1, wherein the second device is a ground control station (GCS).

5. The method of claim 4, wherein the second network appliance is a ground data terminal (GDT) that is communicatively coupled to one or more systems of the GCS.

6. The method of claim 1, wherein at least two of the plurality of communication links are router diverse from one another.

7. A communication component for use in a first device of an unmanned aerial system (UAS), the communication component comprising:
   a memory for storing computer-executable instructions; and
   a processor that, upon executing the instructions, instantiates a first arbiter that is configured to:
      receive information for transmission to a destination associated with a second device of the UAS;
      insert a message sequence indication into a data packet having a payload that contains the information;
      transmit respective copies of the data packet over each of a plurality of communication links established between the first and second UAS devices;
      wherein multiple copies of the information exists on the destination only after being sent to the destination by the first arbiter; and
      when the value of the message sequence indication in the data packet is less than or equal to a local sequence indication carried by the second device, discard the copy of the data packet.

8. The communication component of claim 7, wherein the second arbiter determines whether to deliver the information by comparing the message sequence indication from each received copy of the data packet with the local sequence indication maintained by the second arbiter.

9. The communication component of claim 8, wherein the second arbiter is further configured to:
   when a value of the message sequence indication in the copy of the data packet is greater than a value of the local sequence indication, store the copy of the data packet in a queue for subsequent delivery to the destination.

10. The communication component of claim 7, wherein the first UAS device is an unmanned aerial vehicle (UAV) and the second UAS device is a ground control station (GCS).

11. The communication component of claim 7, wherein the first UAS device is a ground control station (GCS) and the second UAS device is an unmanned aerial vehicle (UAV).

12. The communication component of claim 7, wherein the first arbiter inserts the message sequence indication by embedding the message sequence indication into the payload of the data packet.

13. The communication component of claim 12, wherein the processor, upon executing the instructions, further instantiates a second arbiter that is configured to:
   receive, from the second UAS device, multiple copies of a data packet having a destination on the first UAS device; and
   determine, for each received copy of the data packet, whether to deliver the information to the destination.

* * * * *